United States Patent [19]

Kitamura

[11] Patent Number: 4,985,971
[45] Date of Patent: Jan. 22, 1991

[54] PALLET CHANGER

[75] Inventor: Koichiro Kitamura, Takaoka, Japan

[73] Assignee: Kitamura Machinery Co., Ltd., Toyama, Japan

[21] Appl. No.: 415,256

[22] PCT Filed: Mar. 10, 1988

[86] PCT No.: PCT/JP88/00251
§ 371 Date: Sep. 15, 1989
§ 102(e) Date: Sep. 15, 1989

[87] PCT Pub. No.: WO88/06945
PCT Pub. Date: Sep. 22, 1988

[30] Foreign Application Priority Data

Mar. 17, 1987 [JP] Japan .................................. 62-60032

[51] Int. Cl.$^5$ ............................................. B23Q 7/04
[52] U.S. Cl. ................................. 29/33 P; 198/346.1; 414/224; 414/730
[58] Field of Search ........................ 29/563, 33 P, 568; 82/124; 198/346.1, 339.1, 345, 502.1, 346.2; 51/DIG. 15; 414/1, 749, 747, 736, 729, 739, 730, 740, 222, 225, 224; 901/7, 29, 41, 35, 48, 42

[56] References Cited

U.S. PATENT DOCUMENTS

| | | | |
|---|---|---|---|
| 4,013,176 | 3/1977 | Lohneis | 414/730 |
| 4,302,144 | 11/1981 | Hallqvist | 414/739 X |
| 4,359,815 | 11/1982 | Toyoda | 29/568 |
| 4,365,920 | 12/1982 | Morgan | 414/224 |
| 4,457,659 | 7/1984 | Watanabe | 414/744.8 |
| 4,626,160 | 12/1986 | Shiom et al. | 198/345 X |
| 4,646,422 | 3/1987 | McMurtry | 29/568 |
| 4,685,850 | 8/1987 | Ohta et al. | 414/225 |
| 4,800,645 | 1/1989 | Limongelli et al. | 198/346.1 X |
| 4,809,422 | 3/1989 | Kitamura | 29/33 P X |
| 4,845,835 | 7/1989 | Schneider | 414/1 |
| 4,872,380 | 10/1989 | Holt | 82/124 |

FOREIGN PATENT DOCUMENTS 44276 12/1972 Japan .
18984 7/1975 Japan .
244440 10/1986 Japan .

Primary Examiner—William Briggs
Attorney, Agent, or Firm—Wegner, Cantor, Mueller & Player

[57] ABSTRACT

A pallet changer for a machine tool comprising:
(a) a work station comprising a plurality of members which form holes for a plurality of pallets each having a workpiece, the members being arranged at predetermined intervals in an endless chain manner such that one of the members can be positioned at a predetermined position;
(b) a table for the machine tool for mounting one of the pallets; and
(c) a pallet transferor positioned between the workstation and the machine tool to exchange one of the pallets positioned at the predetermined position for the pallet mounted in the table, the pallet transferor comprising,
(1) a first mover arranged to be movable in a first direction parallel to the arrangement direction of the pallets positioned in the predetermined position,
(2) a swinger mounted with respect to the first mover, the swinger being rotatable at a predetermined angle,
(3) a second mover for moving the swinger along a second direction perpendicular to the first direction,
(4) a rotator operably arranged with the swinger,
(5) a third mover operably arranged with respect to the rotator, the third mover being moved along a third direction perpendicular to the second direction, and
(6) first and second arms for detachably gripping the pallet positioned at the predetermined position and the pallet mounted on the table, the first and second arms being operably arranged with respect to the third mover such that the first and second arms can be rotated at a predetermined angle.

10 Claims, 21 Drawing Sheets

PALLET CHANGER

TECHNICAL FIELD

This invention relates to a pallet changer.

BACKGROUND ART

A flexible manufacturing system (FMS) comprises a pallet changer and a machining center. The pallet changer has a workstation and a robot for transferring pallets.

In the workstation, a plurality of pallets each having a workpiece are arranged in an endless type transfer means. By operating the transfer means, the robot sequentially faces the pallets. In addition, the robot has a holder for detachably holding the pallet. The robot is fixed in a predetermined position.

As an example, a pallet facing a holder is held by the holder and then a workpiece and the pallet thereof are moved from the workstation to a table of the machining center. Also, after machining the workpiece, the workpiece and the pallet on the table of the machining center are moved back to the initial position in the workstation.

After that, when machining a workpiece next to the machined workpiece, a transfer means is operated in such a manner that the workpiece faces the robot. Similarly, the workpiece and the pallet for the workpiece are transferred to machine the workpiece.

In addition, when machining a workpiece remote from the previously machined workpiece, the transfer means is moved along a long distance and then the workpiece that is currently being machined faces the robot. Thus, the workpiece and the pallet for the workpiece are transferred by the robot to machine the workpiece.

Such a transfer means has a tendency to become large, because the number of workpieces to be set in the transfer means increases so as to automatically operate the workstation for a long time. Accordingly, when exchanging the workpiece and the pallet for the workpiece, a selected workpiece is moved to the robot by operating the large transfer means. Consequently the transfer time is long and the workpiece exchanging efficiency is low.

DISCLOSURE OF INVENTION

In order to solves these problems, the object of this invention is to provide a pallet changer in which a desired workpiece and a pallet for the workpiece can be efficiently exchanged and transferred.

The gist of this invention resides in a pallet changer comprising: a workstation for arranging a plurality of pallets each having a workpiece; holders for each detachably holding the pallet; and, a robot for transferring the pallets held by the holders from the workstation and then returning the pallets to the workstation, characterized in that the holders can be moved in the direction parallel to the arrangement of the plural pallets and the holders can be positioned to the desired pallet.

According to this invention, holders can be moved in the arrangement direction of plural pallets and quickly positioned to the desired pallet. Accordingly, it is not necessary to operate a transfer means of the workstation every time the workpiece and the pallet are exchanged. The pallets each having a desired workpiece can be efficiently exchanged and transferred.

BEST MODE FOR CARRYING OUT THE INVENTION

FMS

Figure 1:
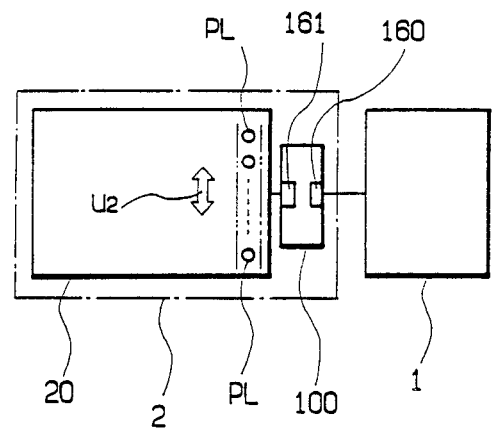
FIG. 1 schematically shows a flexible manufacturing system including a pallet changer according to this invention.

FIG. 1 shows a machining center 1 and a pallet changer 2. The pallet changer 2 has a workstation 20 and a robot 100. A flexible manufacturing system (FMS) comprises the pallet changer 2 and the machining center 1.

Machining Center

Figure 2:
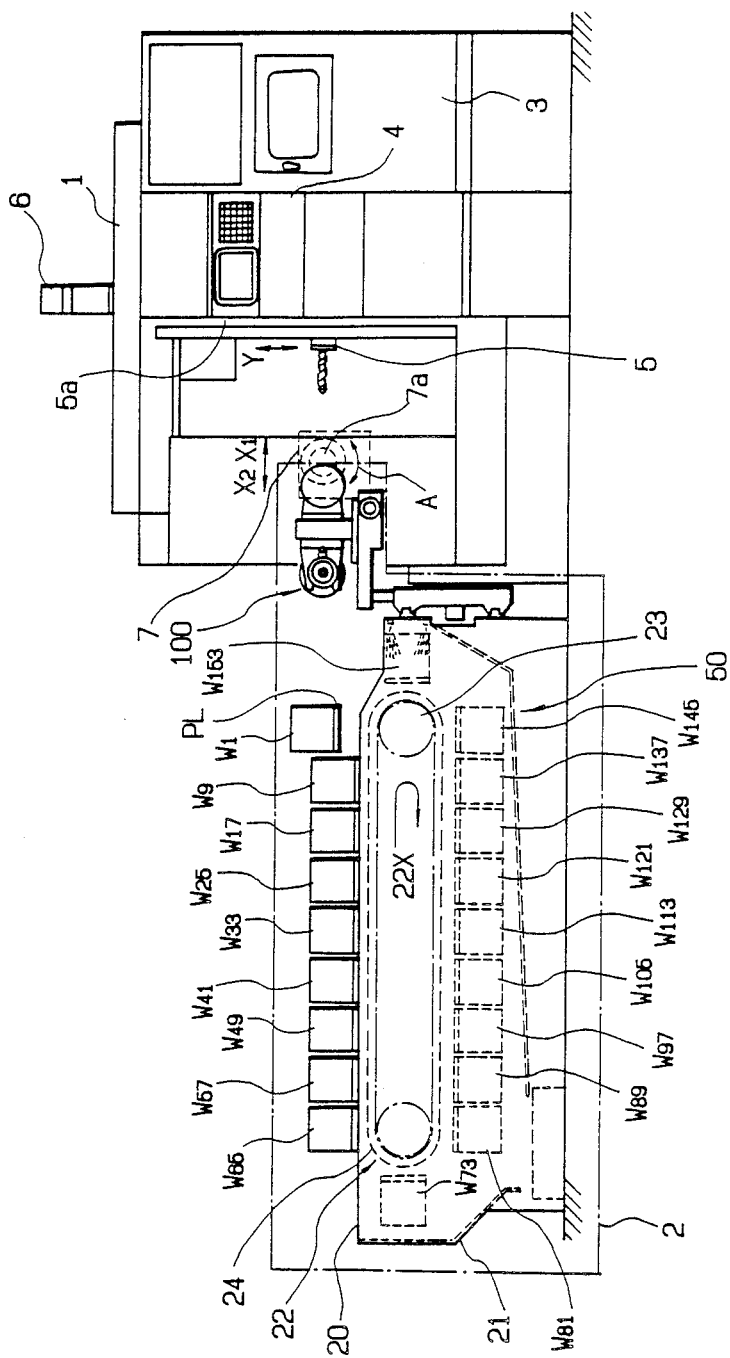
FIG. 2 is a side elevational view showing the pallet changer and a machining center.

FIG. 2 shows the machining center 1 in detail. The machining center 1 is equipped with a CNC unit 3 and an operation panel 4. A spindle 5 of a column 5a can be moved in the Y-direction by operating a servomotor 6. The spindle 5 can be rotated by a motor not shown.

A table 7 is used for mounting a pallet for a workpiece which will be explained hereinafter. The table 7 has a tapered hole 7a. Also, the table 7 can be indexed in the A direction.

Figure 3:
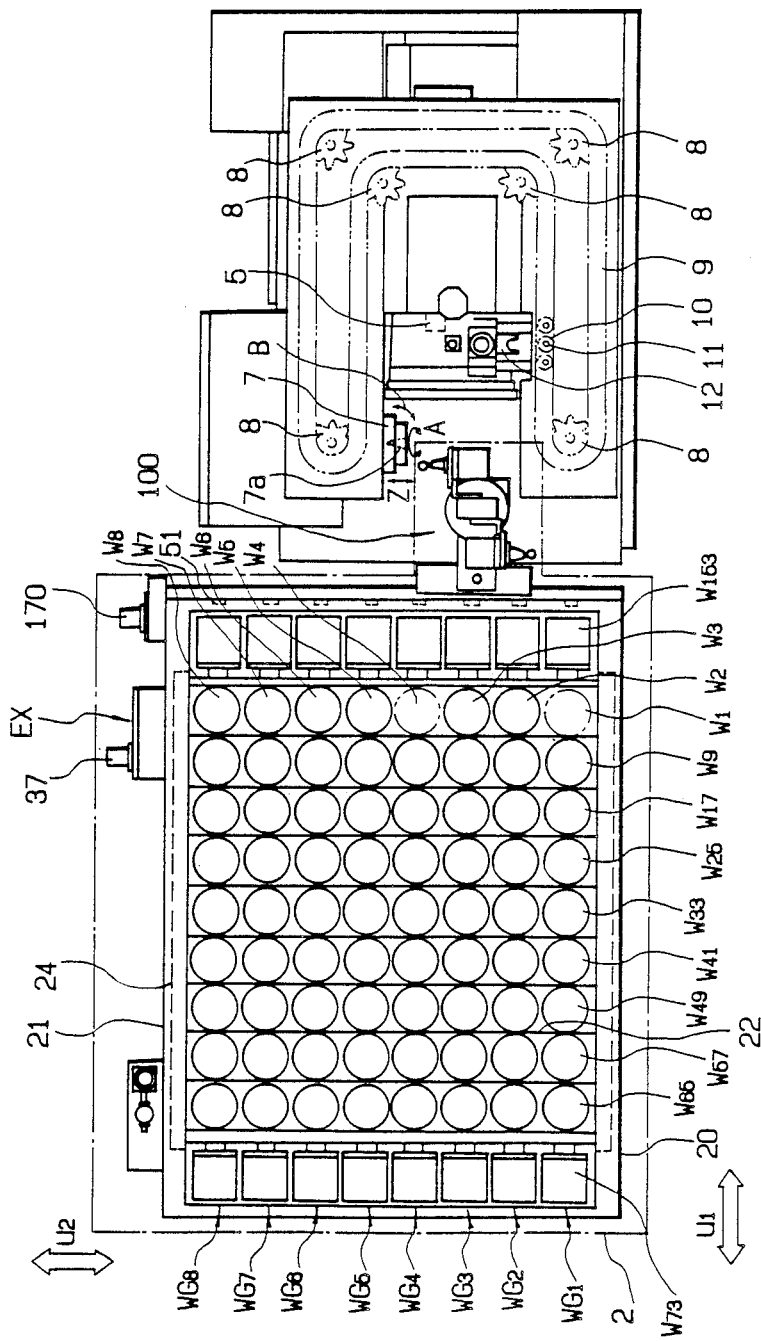
FIG. 3 is a top view showing the pallet changer and the machining center.

FIG. 3 shows that the table 7 can be moved in the Z direction. In addition, the table 7 can be indexed in the B direction. A plurality of sprockets 8 are provided on an upper portion of the machining center 1. A transfer chain 9 and the sprockets 8 are engaged. 100 toolholders 10, for example, are detachably attached in the transfer chain 9. Each toolholder 10 has a tool 11. In addition, the machining center 1 is provided with an automatic tool changer 12. The automatic tool changer 12 is designed to mount the desired tool holder 10 of the transfer chain 9 in the spindle 5. The automatic tool changer 12 is an automatic tool changer as disclosed in Japanese Patent Application No. 61-27892, for example.

Workstation

FIG. 2 shows a frame 21 of the workstation 20 equipped with a transfer means 22. The transfer means 22 can be operated by a drive means 23 in the feed direction 22X. A plurality of pallets PL are detachably arranged in the transfer means 22. Each pallet PL is provided with a workpiece (W1, for example) The transfer means 22 can be moved along endless guide rails 24.

As one embodiment, FIGS. 2 and 3 show 160 pallets PL each having a workpiece that are mounted in the workstation 20. In the transfer means 22, 20, pallets PL are arranged in the first direction of FIG. 3 (U1 direction of FIG. 3 or feed direction 22X of FIG. 2). 20 workpieces W1, W9, W17, W25, W33, W41, W49, W57, W65, W73, W81, W89, W97, W105, W113, W121, W129, W137, W145, W153 set on 20 pallets, respectively, constitute a group of workpieces WG1. 8 groups of workpieces WG1 to WG8 are arranged in the second direction U2.

Figure 4:
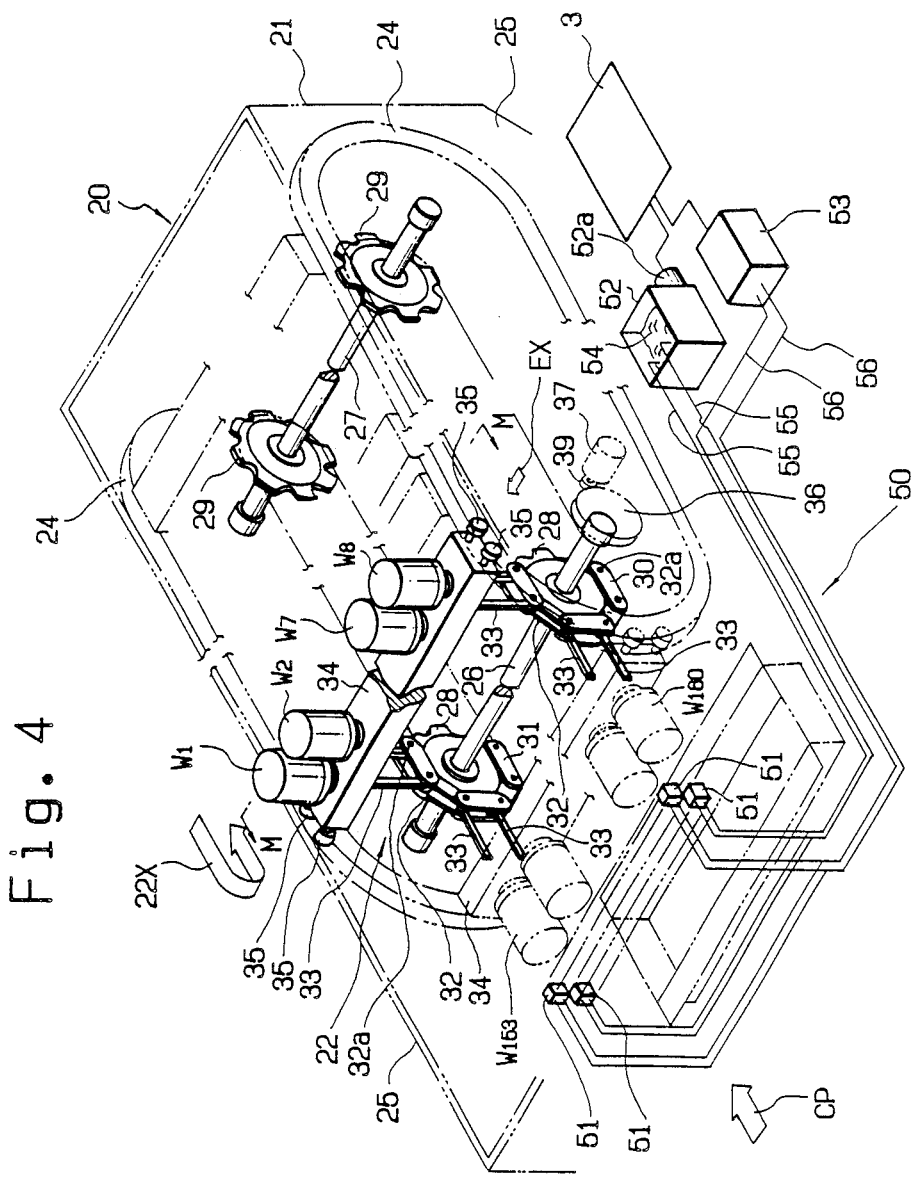
FIG. 4 is a perspective view, with revealing an interior structure of the pallet changer.

FIG. 4 shows the transfer means 22 that comprises 20 mounting members 34, two chains 30, 31, supports 33, shafts 26, 27, four sprockets 28, 29 and a multitude of rollers 35.

Also, the drive means 23 has a servomotor 37, gears 36, 39. The guide rails 24, 24 are fixed onto the inside of side walls 25, 25 of the frame 21, respectively The shafts 26, 27 are supported between the side walls 25, 25. The two sprockets 28 are attached to the shaft 26 while the two sprockets 29 are attached to the shaft 27. The chain 30 is arranged between the sprockets 28 and 29. The chain 31 is arranged between the sprockets 28 and 29. The chains 30 and 31 are identical in structure. Links 32 of the chain 30 or links 32 of the chain 31 are connected by a pin 32a each other. An end of a support 33 is fixed to each pin 32a. The adjacent two supports 33 of the chain 30 are fixed on the lower side of the mounting member 34. The adjacent two supports 33 of the chain 31 are fixed on the lower side of the mounting member 34. The mounting member 34 has a square-cross section. The 20 mounting members 34 are fixed to the chains 30, 31 by means of the supports 33. The two rollers 35 are arranged on both sides of the mounting member 34, respectively. The rollers 35 are designed to be guided along the guide rails 24, 24.

Figure 5:
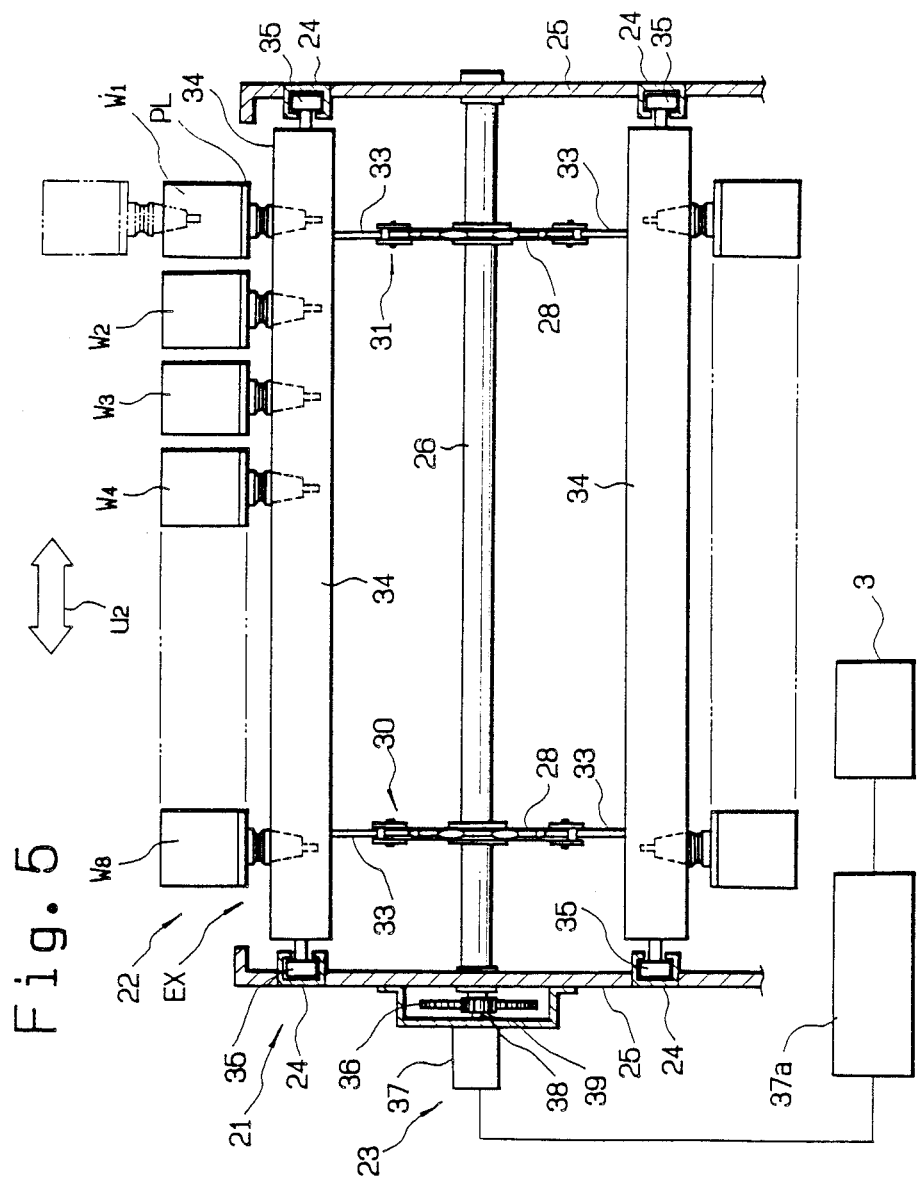
FIG. 5 is an end view taken along the M—M line.

FIG. 5 illustrates an end view taken along the M—M line of FIG. 4. The shaft 26 is provided with a gear 36. The servomotor 37 is secured to the frame 21 and electrically connected to a servo-control unit 37a. The servo-control unit 37a is connected to the CNC unit 3 so as to control the servomotor 37 according to the program in the CNC units 3. A gear 39 is attached to an output shaft 38 of the servomotor 37. The gear 39 and the gear 36 engage each other. The eight pallets PL are detachably mounted in each mounting member 34. The workpieces W1 to W8 are fixed on the pallets in the exchange position, respectively. In the Figure, the rollers 35 are guided along the guide rails 24, respectively.

Figure 6:
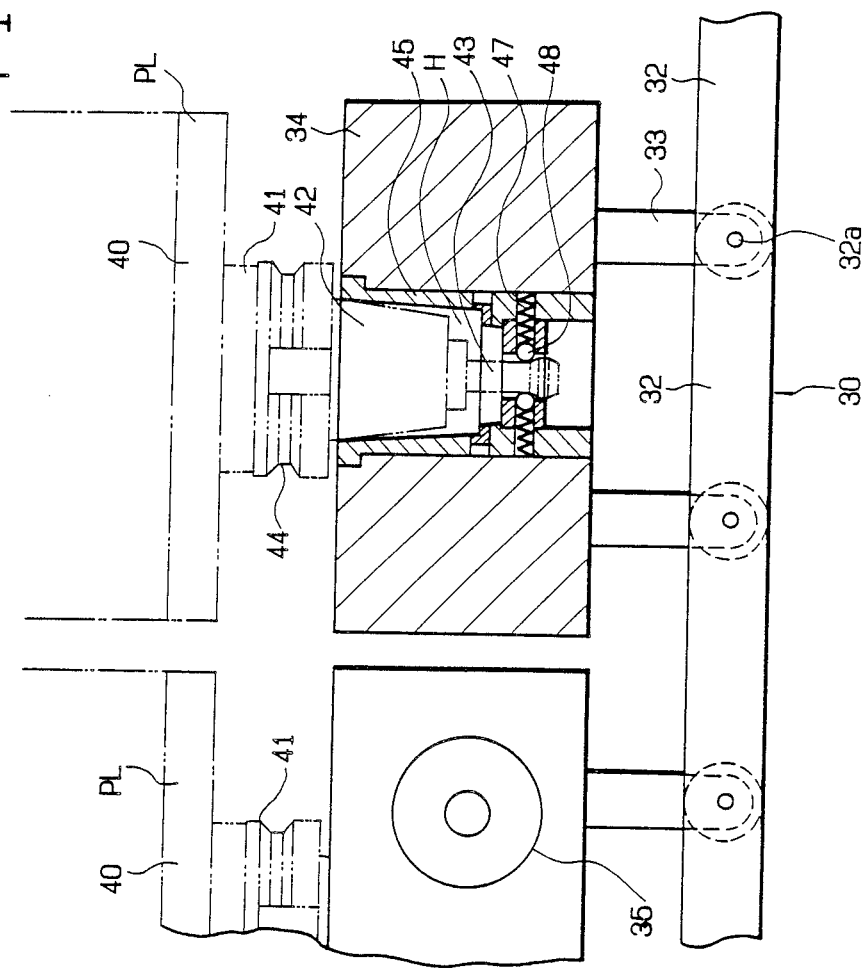
FIG. 6 is a side view, revealing the pallets, the mounting members, and a chain.

FIG. 6 shows the pallets PL and the mounting members 34 in detail. The pallet PL comprises a circular plate 40 and a holder 41. The holder 41 has a tapered portion 42 and a stud 43. In addition, the holder 41 has a groove 44. An insert member 45 is provided within the mounting member 34 and has a tapered hole H therein. In addition, the insert member 45 has springs 47 and balls 48. By inserting the tapered portion 42 of the holder 41 into the tapered hole H, the spring 47 presses the ball 48 against the stud 43. Thus, the holder 41 is detachably fixed in the insert member 45. As the above-mentioned, the end portion of the support 33 is fixed on the side face of the mounting member 34. Another end portion of the support 33 is fixed to the pin 32a of the chain 30.

Cleaning Unit

FIG. 4 shows a cleaning unit 50 that comprises a multitude of nozzles 51, a cutting oil reservoir 52 and an air supply means 53. There is cutting oil 54 in the reservoir 52. The reservoir 52 and nozzles 51 are connected by way of lines 55 while the air supply means 53 and the nozzles 51 are connected by way of lines 56. The nozzles 51 face the mounting member 34 which is positioned in the cleaning position CP, corresponding to the side portion of the transfer means 2. The mounting member 34 in the side position is remote from the two adjacent mounting members 34. There are 16 nozzles 51. The nozzles 51, 51 in pairs correspond to one of the workpieces W153–W160. The reservoir 52 is provided with a pump 52a. It is possible to spray the cutting oil 54 from the nozzles 51 by operating the pump. In addition, the air supply means 53 is capable of jetting cool air or hot air from the nozzles 51. The pump 52a and the air supply means 53 are controlled by the CNC unit 3.

Robot

Figure 7:
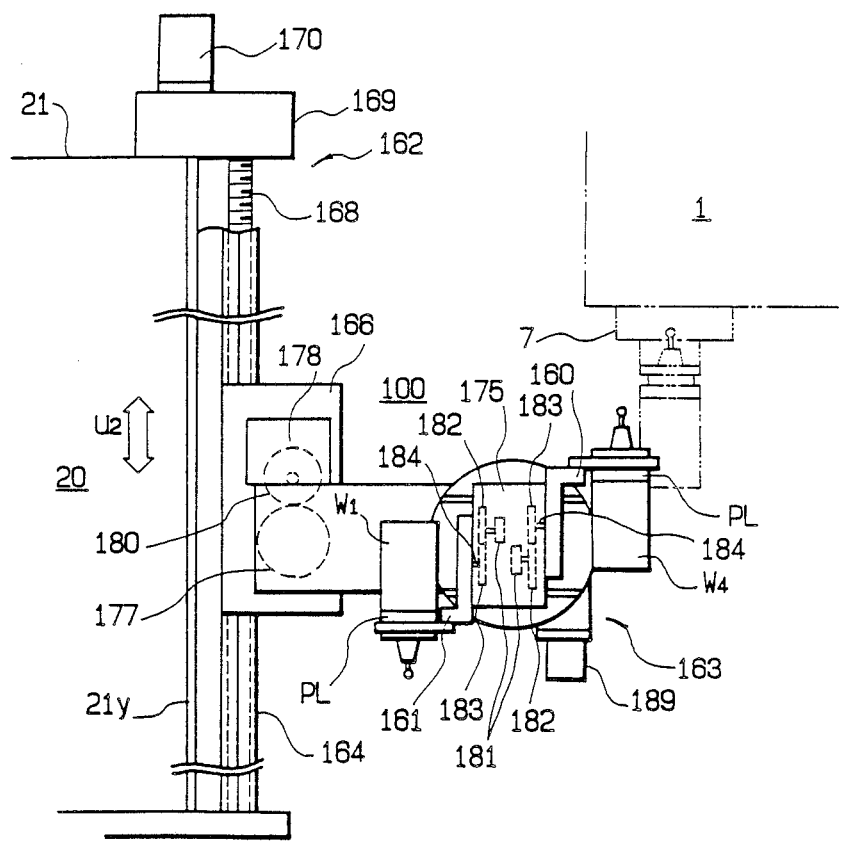
FIG. 7 is a top view of a robot.
Figure 8:
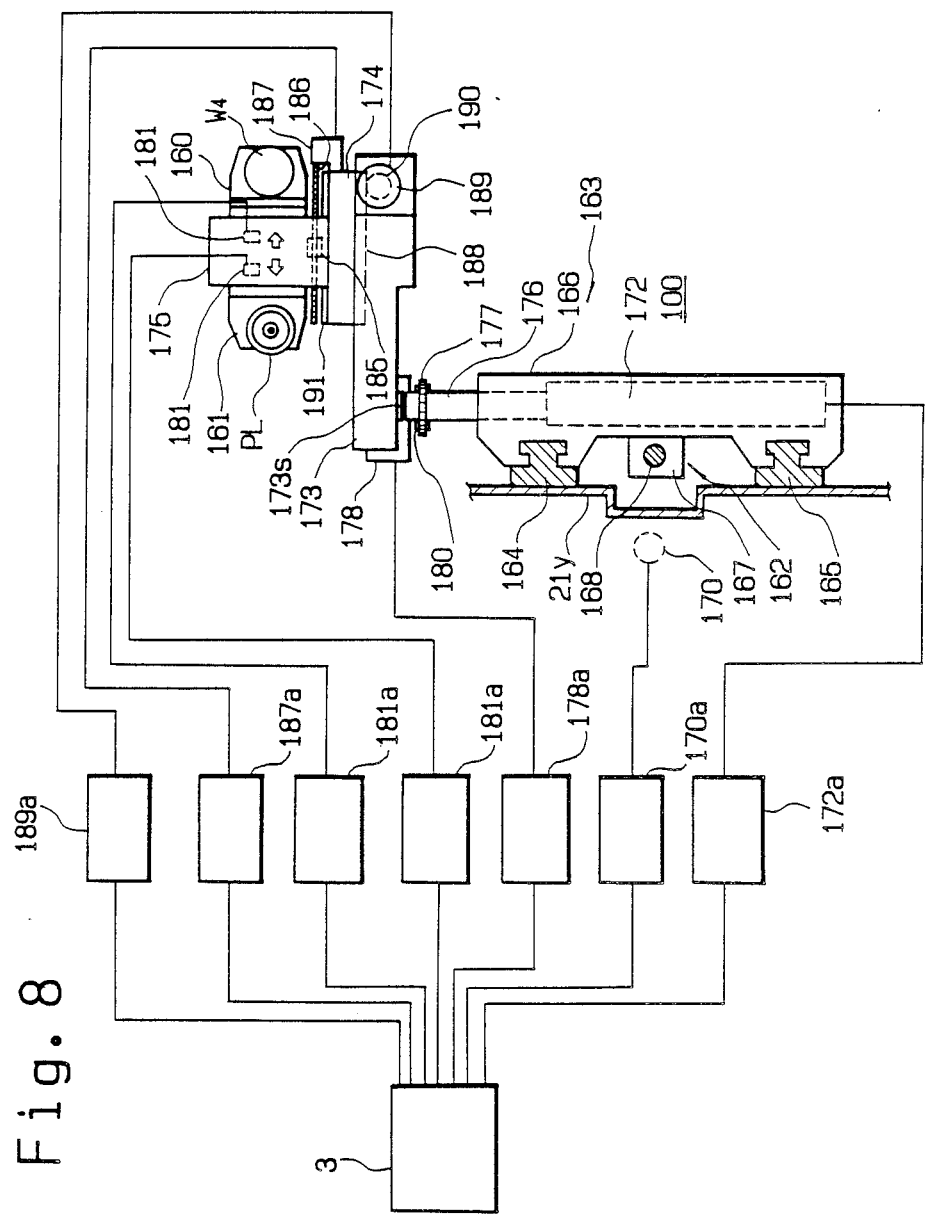
FIG. 8 is a side view of the robot with a partially cutaway portion.

Referring to FIGS. 7 and 8, the robot 100 has a first arm 160, a second arm 161, a moving and positioning means 162 and a transfer operation means 163.

Two rails 164, 165 are horizontally fixed on a front wall 21y of the workstation 21. A slide table 166 is arranged on the rails 164, 165.

The moving and positioning means 162 has a servomotor 170, a speed reducer 169, a feed screw 168, a nut 167, the slide table 166 and the rails 164, 165. The slide table 166 is provided with a nut 167 which engages with a feed screw 168. One end of the feed screw 168 extends to the speed reducer 170. The speed reducer 169 is provided with a servomotor 170. By operating the servomotor 170 to rotate the feed screw 168, the slide table 166 can be horizontally moved (the second direction U2).

The transfer operation means 163 has a cylinder 172, a swing member 173, a rotary circular plate 174, a slide member 175, servomotors 178, 187, 181, 189, a worm gear 188, a nut 185, a feed screw 186, a worm 190 and gears 180, 177.

The cylinder 172 is equipped within the slide table 166. The swing member 173 is rotatably mounted with an end portion thereof on a rod 176 of the cylinder 172. The slide member 175 is provided on the rotary circular plate 174. The servomotor 178 is attached to the swing member 173. An output shaft of the servomotor 178 is provided with the gear 180. The gear 177 of the rod 176 and the gear 180 engage each other. Incidentally, a shaft 173S of the swing member 173 is rotatably connected to the upper portion of the rod 176.

The slide member 175 is provided with two servomotors 181. Each servomotor 181 can transmit power by way of gears 182, 183 to a shaft 184. The first arm 160 is fixed to the shaft 184. By operating the servomotor 181, the first arm 160 can be rotated at 90° about the shaft 184. Similarly, the second arm 161 can be rotated at 90° about a shaft 184. The nut 185 is fixed to a lower side of the slide member 175 and engages the feed screw 186 which can be rotated by the servomotor 187. Rails 191 are provided on the rotary circular plate 174. In addition, the swing member 173 is equipped with the servomotor 189. The servomotor 189 has the worm 190 while the worm gear 188 is fixed on a low side of the rotary circular plate 174. The worm 190 and the worm gear 188 engage each other.

The servomotor 181 is connected through a servocontrol unit 181a to the CNC unit 3. The servomotor 187 is connected through a servo-control unit 187a to the CNC unit 3. The servomotor 189 is connected through a servo-control unit 189a to the CNC unit 3. The servomotor 170 is connected through a servo-control unit 170a to the CNC unit 3. The servomotor 178 is connected through a servo-control unit 178a to the CNC unit 3. In addition, the cylinder 172 is connected to a hydraulic source 172a which is electrically connected to the CNC unit 5.

Figure 9:
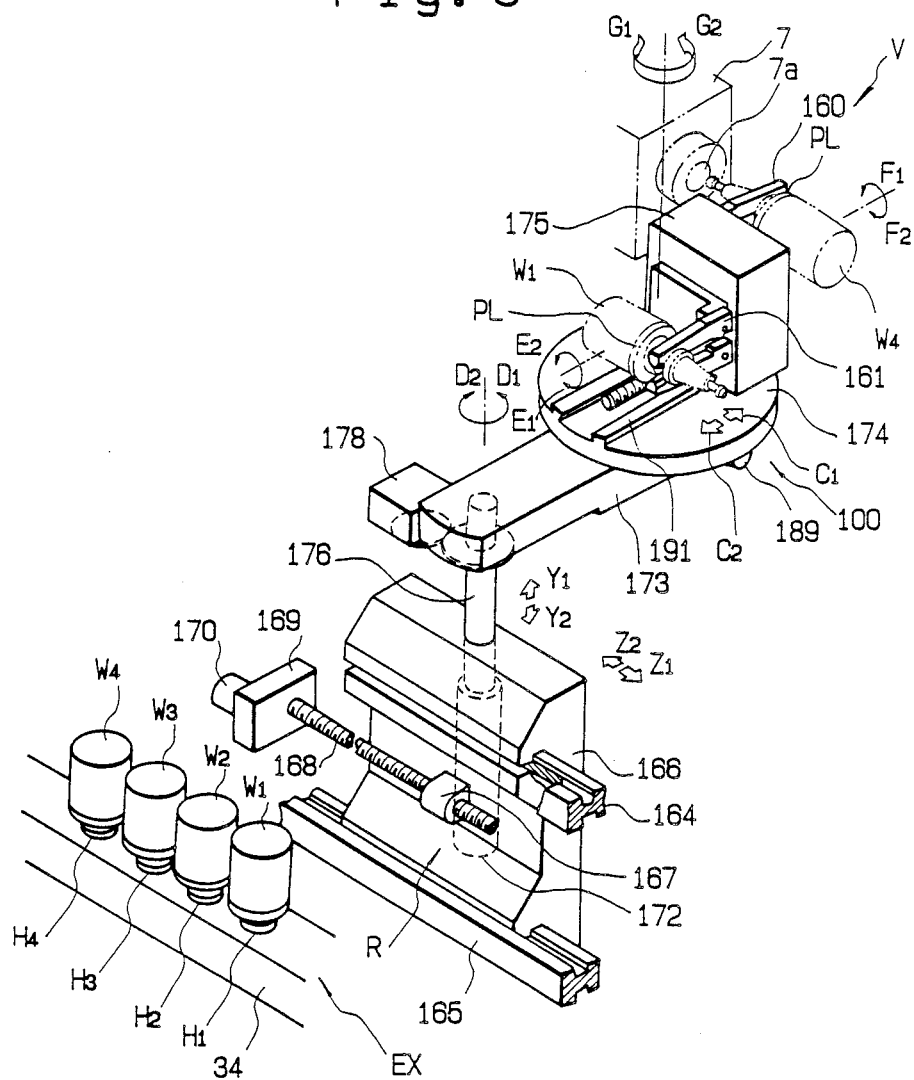
FIG. 9 is a perspective view showing the robot.

Referring to FIG. 9, the slide table 166 can be moved in the direction of arrow Z1 or Z2 by the servomotor 170. The direction of arrow Z1 or Z2 is parallel to the second direction U2. A rod 176 of the cylinder 172 can be moved in the direction of arrow Y1 or Y2. The cylinder 172 is preferably a hydraulic cylinder. The swing member 173 can be rotated at 180° in the direction D1 or D2 by the servomotor 178. The rotary circular plate 174 can be rotated in the direction G1 or G2 by the servomotor 189. The slide member 175 can be moved on the swing member 173 in the direction C1 or C2 by operating the servomotor 187 (see FIG. 8). In addition, the first arm 160 can be rotated in the direction F1 or F2. The second arm 161 ca be rotated in the direction E1 or E2.

Incidentally, FIG. 9 shows the robot 100, the mounting member 34 of the workstation and the table 7 of the machining center. The mounting member 34 is in the exchange position EX for the workstation. The tapered holes H (H1, H2, H3, H4) of the mounting member 34 are arranged in the exchange position EX. The slide table 166 is in an initial position R. The pallet PL is not mounted in the tapered hole 7a of the table 7.

Figure 10:
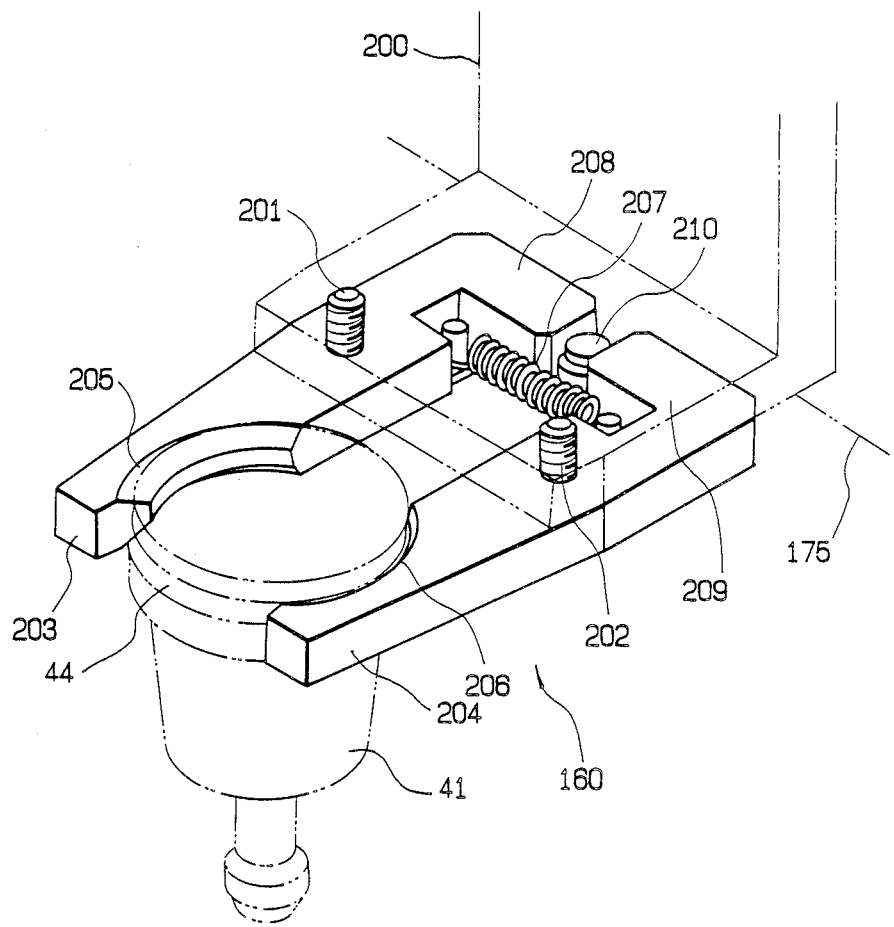
FIG. 10 is a perspective view of an arm.

Referring to FIG. 10, FIG. 10 shows the first arm 160. However, the first and second arms 160, 161 are identical in structure (see FIG. 9).

The first arm 160 has a support 200, and fingers 203, 204. The support 200 is rotatably supported on the slide member 175. The finger 203 is rotatably supported on the support 200 by means of a bolt 201. In addition, the finger 204 is rotatably supported on the support 200 by means of a bolt 202. Claws 205, 206 are formed in opposed sides of the fingers 203, 204, respectively. The claws 205, 206 engage the groove 44 of the holder 41. A spring 207 is arranged between the fingers 203, 204. A pin 210 is designed to be inserted between rear portions 208, 209.

In case the holder 41 is clamped by the fingers 203, 204, the pin 210 is forceably inserted between the rear portions 208, 209 against force of the spring 207 thereby to clamp the holder 41. In case of releasing the holder 41 from the fingers 203, 204, the pin 210 is removed thereby to open the fingers 203, 204 by force of the spring 207.

The robot, the workstation, the cleaning unit and the machining center can be operated by the program in the CNC unit 3.

Operation

Machining Center

In FIG. 2, the drill has already been mounted in the spindle 5 of the machining center 1. In FIG. 9, the table 7 is positioned in the predetermined position V.

Workstation

FIGS. 4 and 5 illustrate that by operating the motor 37, the mounting members 34 of the transfer means 22 are moved in the direction 22X. The desired mounting member 34 moves up to the exchange position EX. The workpieces W1 to W8 are positioned in the exchange position EX.

Transfer of the Pallet and the Workpiece thereon by the Robot

Figure 11:
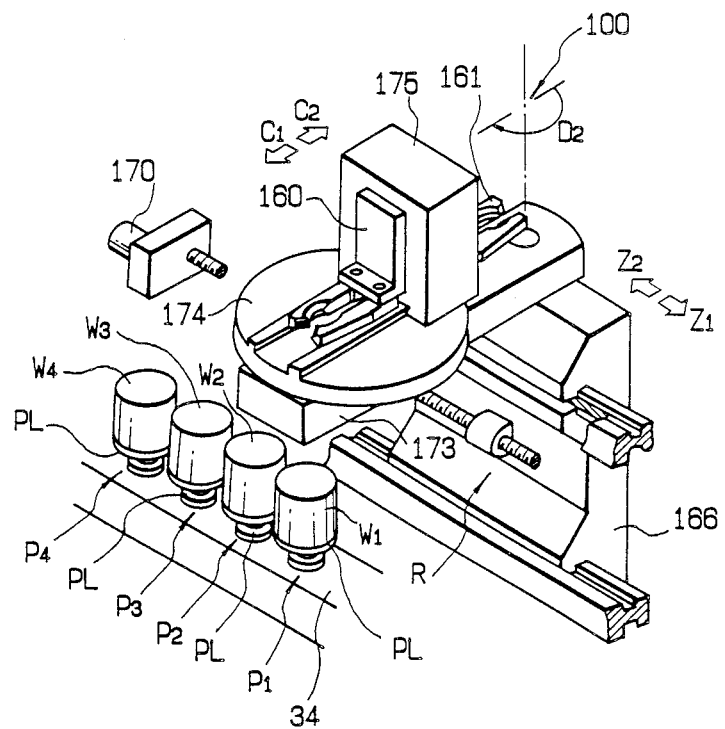
FIG. 11 is a perspective view showing he robot directed to the mounting member positioned in an exchange position.

FIG. 9 shows the robot 100 positioned in the initial position R. In FIG. 11, the swing member 173 faces the mounting member 34 of the transfer means. In FIG. 11, the slide member 175 is fully moved back in the direction of arrow C2. Each of the first and second arms 160, 161 does not hold the pallet PL. The rod 176 of FIG. 9 retracts.

The transfer of the workpiece W1, the pallet PL for the workpiece W1, the workpiece W4 and the pallet PL for the workpiece W4 is explained by the following.

By operating the servomotor 170 in FIG. 11, the slide table 166 is moved in the direction of arrow Z2 for positioning the slide table 166 in the position P4. That is, the first arm 160 faces the workpiece W4.

Figure 12:
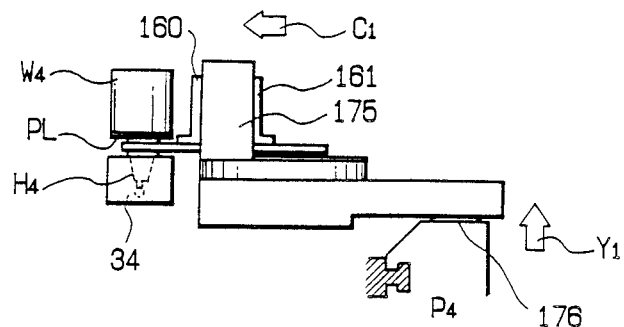
FIGS. 12 to 39 show the robot operation.

FIG. 12 shows that the slide member 175 moved in the direction C1 thereby to hold the pallet PL for the workpiece W4 by the first arm 160. Next, the rod 176 is moved up in the direction Y1 thereby to remove the pallet PL from the tapered hole H4 of the mounting member 34.

Figure 13:
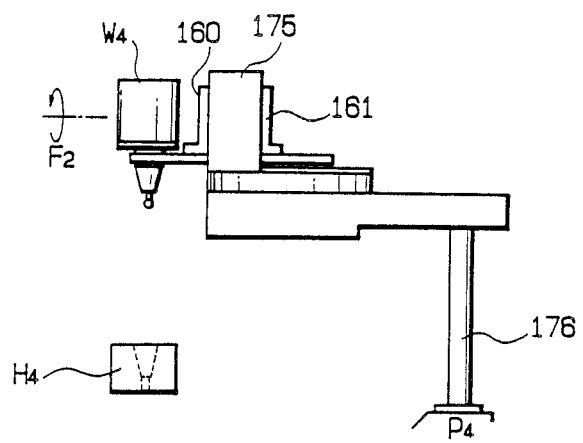

FIG. 13 shows that the first arm 160 is rotated at 90° in the direction F2.

Figure 14:
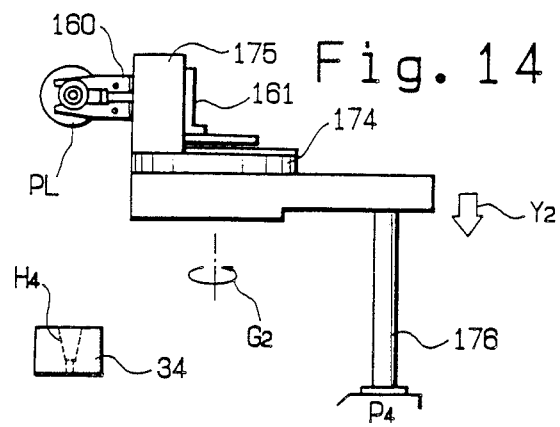

FIG. 14 shows that the rotary circular plate 174 is rotated at 180° in the direction G2 and then the rod 176 is moved down in the direction Y2.

Figure 15:
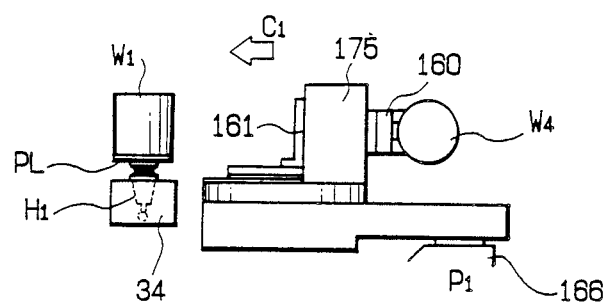

FIG. 15 illustrates that the slide table 166 is moved to the position P1. That is, the second arm 161 faces the pallet PL for the workpiece W1. The slide member 175 is then moved in the direction C1 thereby to hold the pallet PL by the second arm 161.

Figure 16:
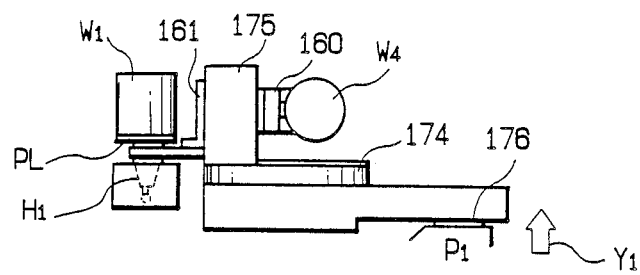

FIG. 16 shows that the rod 176 is moved up in the direction Y1 to remove the pallet PL for the workpiece W1 from the tapered hole H1.

Figure 17:
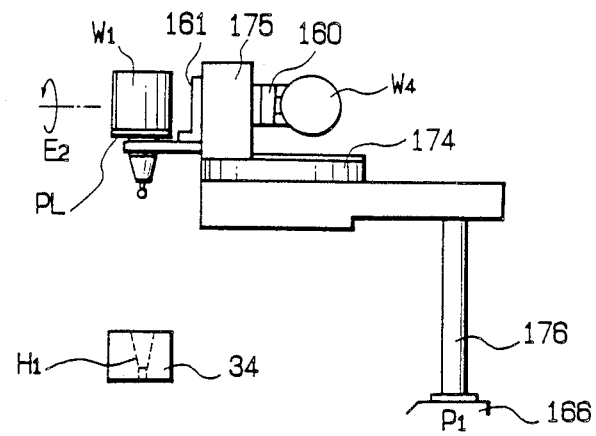

FIG. 17 illustrates that the second arm 161 is rotated at 90° in the direction E2 and then the slide table 166 is moved from the position P1 to the initial position R.

Figure 18:
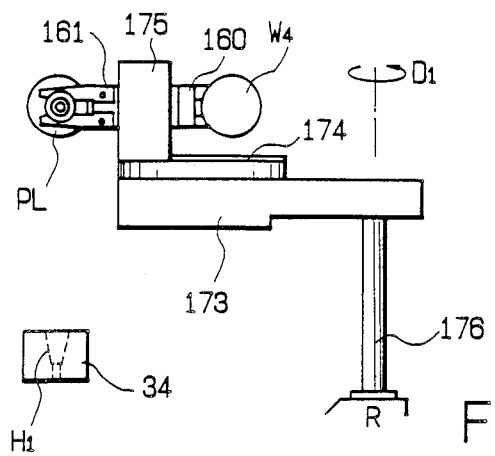

FIG. 18 shows that the swing member 173 is rotated at 180° in the direction D1.

Figure 19:
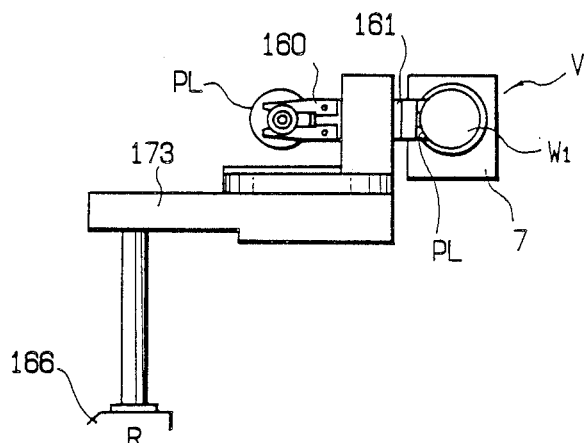
Figure 20:
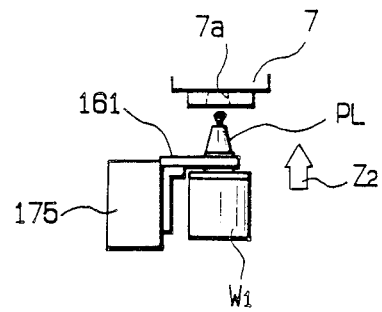

FIGS. 19 and 20 show the pallet PL for the workpiece W1 in front of the tapered hole 7a of the table 7 in the position V. The slide table 166 is moved from the initial position R in the direction Z2 to the tapered hole 7a thereby to insert the pallet PL into the tapered hole 7a.

Figure 21:
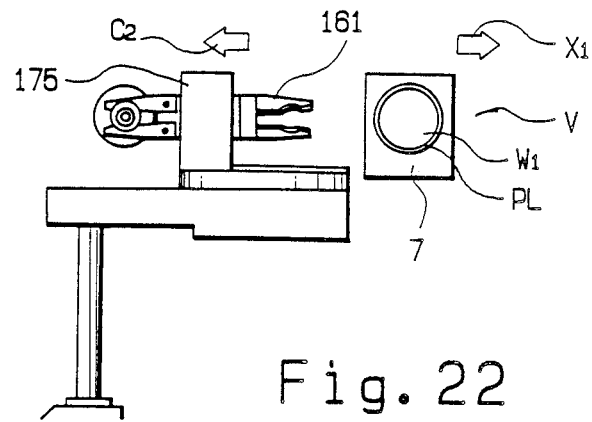

FIG. 21 shows that the slide table 175 is moved in the direction C2 thereby to remove the pullet PL from the second arm 161. The table 7 is moved in the direction X1.

Figure 22:
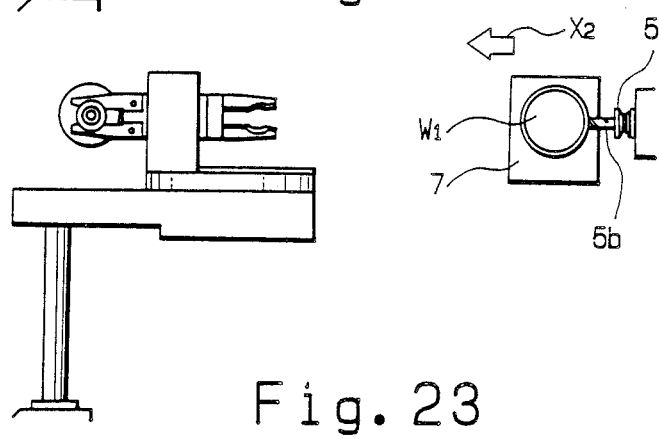

FIG. 22 shows that the workpiece is moved toward the spindle 5 and drilled by rotating the drill 5a at the predetermined position thereof. After drilling, the table 7 is moved in the direction X2.

Figure 23:
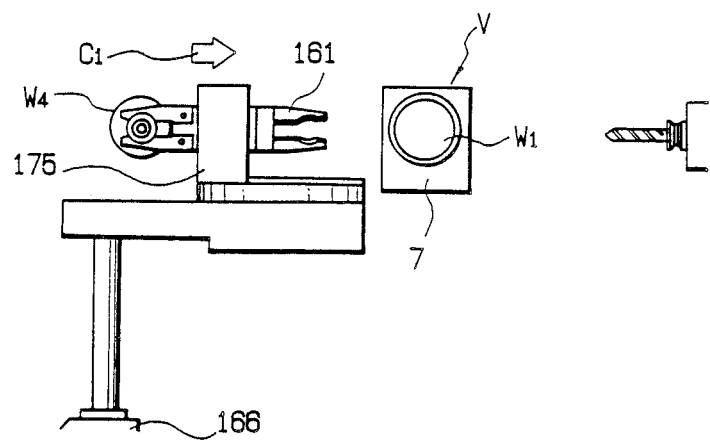

FIG. 23 shows that the slide member 175 is moved in the direction C1 to hold the pallet PL by the second arm 161 again.

Figure 24:
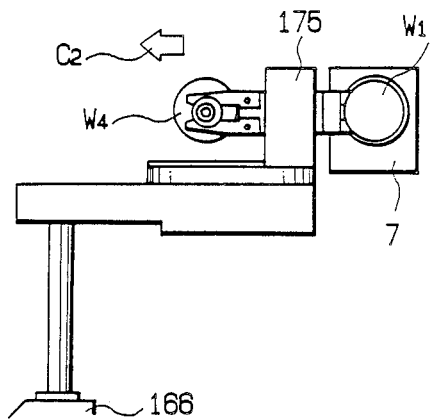
Figure 25:
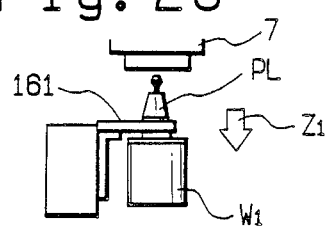

FIGS. 24 and 25 show that the slide table 166 is moved in the direction Z1 to remove the pallet PL from the table 7. Accordingly, the slide table 166 returns again to the initial position R. After that, the slide table 175 is moved in the direction C2.

Figure 26:
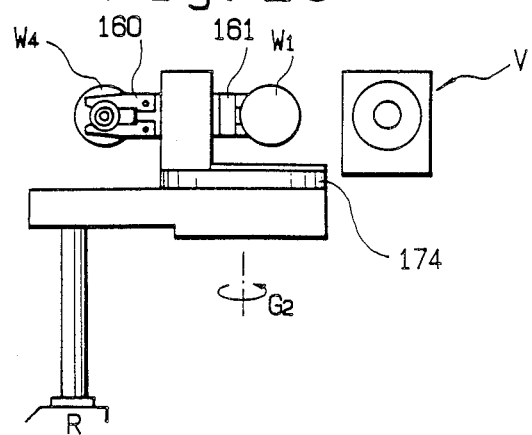

FIG. 26 hows that the rotary circular plate 174 is rotated at 180° in the direction G2.

Figure 27:
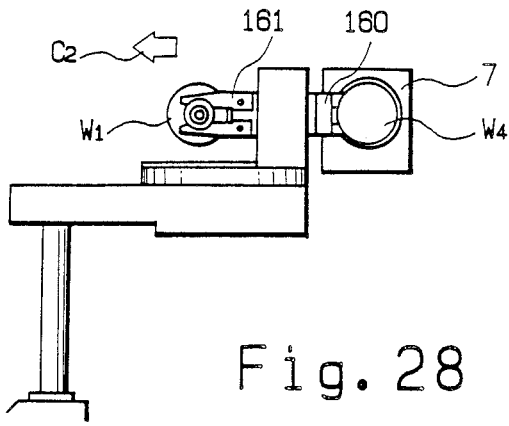
Figure 28:
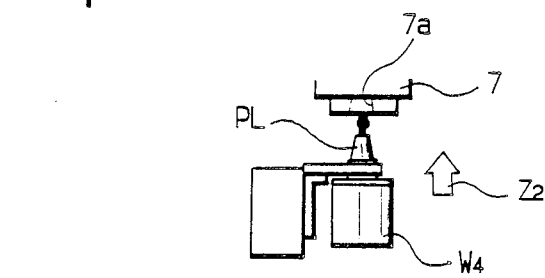

FIGS. 27 and 28 show the pallet PL for the workpiece W4 in front of the tapered hole 7a of the table 7. The slide table 166 is moved in the direction Z2 to insert the pallet PL into the tapered hole 7a.

Figure 29:
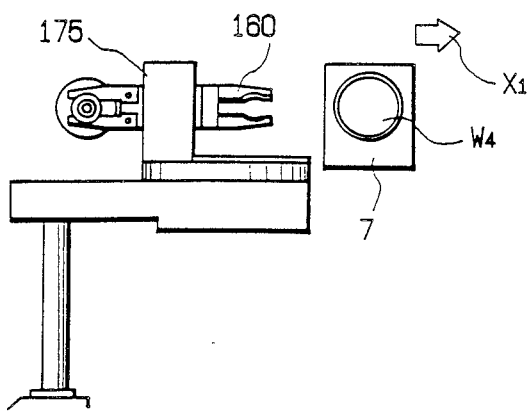

FIG. 29 shows that the slide member 175 is moved in the direction C2 to remove the pallet PL from the first arm 160. The table 7 is moved in the direction X1.

Figure 30:
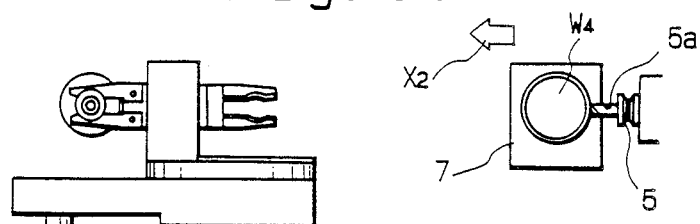

FIG. 30 shows that the workpiece W4 is moved toward the spindle 5 and drilled the workpiece W4 by the drill 5a. After drilling, the table 7 is moved in the direction X2 to the position V.

Figure 31:
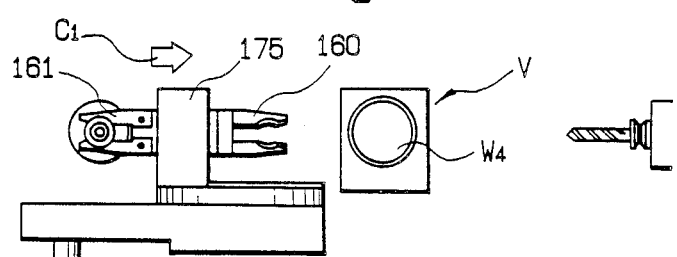

FIG. 31 shows that the slide member 175 is moved in the direction C1 to hold again the pallet PL for the workpiece W4 by the first arm 160.

Figure 32:
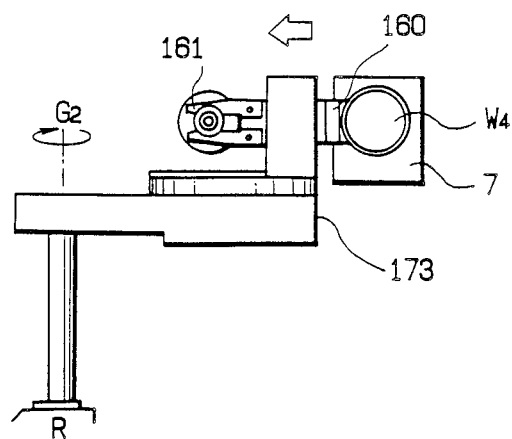
Figure 33:
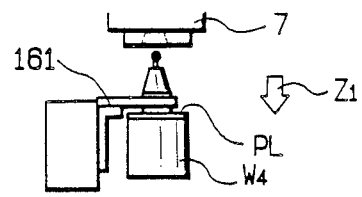

FIGS. 32 and 33 show that the pallet PL is clamped and moved together with the slide table 166 in the direction Z1 to remove the pallet PL from the table 7. The swing member 173 is rotated at 180° in the direction G2. The slide table 166 is in the initial position R.

Figure 34:
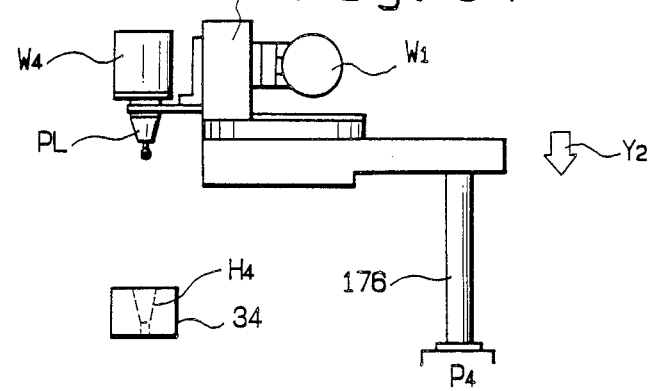

FIG. 34 shows that the slide table 166 is moved from the position R to the position P4. The rod 176 is moved down in the direction Y2 to insert the pallet PL into the tapered hole H4.

Figure 35:
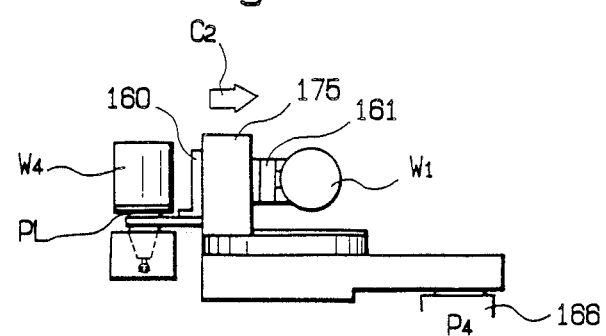
Figure 36:
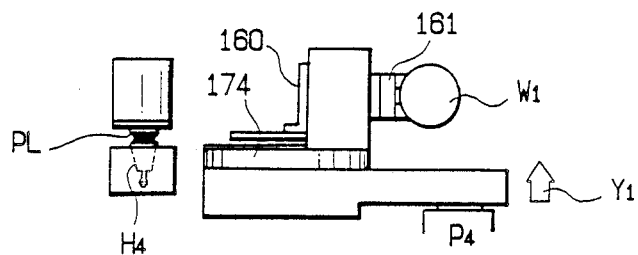

FIGS. 35 and 36 show that the slide member 175 is moved in the direction C2 to remove the pallet PL from the first arm 160 and then moved from the position P4 to the position P1. The rod 176 is moved up in the direction Y1. The rotary circular plate 174 is rotated at 180° in the direction G2.

Figure 37:
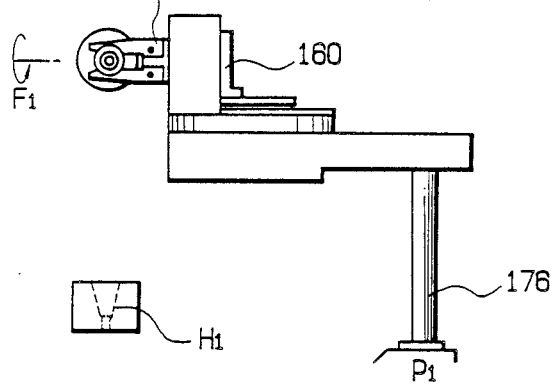

FIG. 37 shows that the second arm is rotated at 90° in the direction F1.

Figure 38:
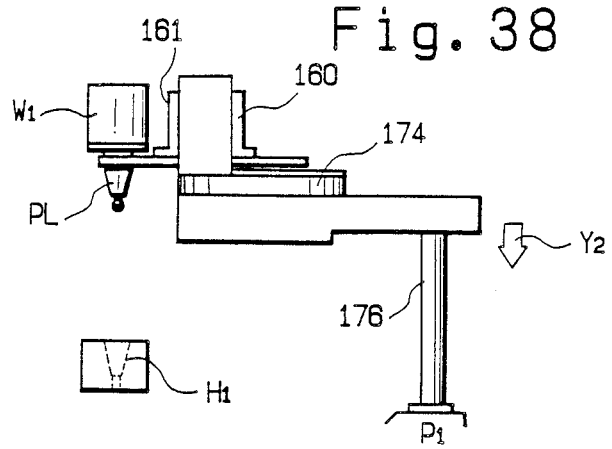

FIG. 38 shows that the rod 176 is moved down in the direction Y2 to insert the pallet PL for the workpiece W1 into the tapered hole H1.

Figure 39:
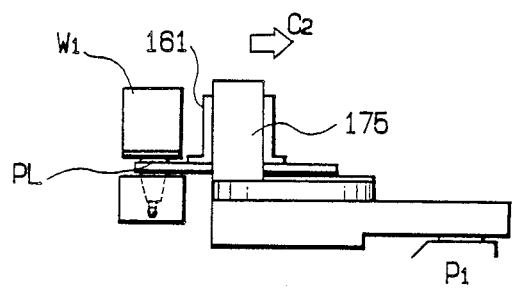

FIG. 39 shows that the slide table 175 is moved in the direction C2 to remove the pallet PL from the second arm 161.

Thus, the pallet PL having the workpiece W1 and the pallet PL having the workpiece W4 can be selected and loaded to perform the machining operations of the workpieces W1, W4. After that, the pallets PL can be unloaded.

The machining operations for the workpieces W1 and W4 are explained above. However, of course, the following is conceivable. The first arm 160 of the robot faces the pallet PL for the workpiece W1 and then the second arm 161 of the robot faces the pallet PL for the workpiece W2. Thus, the pallet PL for the workpiece W1 and the pallet PL for the workpiece W2 can be clamped and then loaded to perform machining operations. After that, they can be unloaded Similarly, the workpieces W3 to W8 can be transferred in sequence.

After machining the workpieces W1 to W8 in the exchange position EX, the transfer means 22 of the workstation are operated to set a next mounting member 34 in the exchange position EX.

Referring further to FIG. 4, the machined workpieces W1 to W8 are moved to the cleaning position CP and then cleaned by the clean unit 50 according to the instructions from the program. That is, chips and dust adhered to the machined workpieces W1 to W8 are cleaned by spraying the cutting oil from the nozzles 51 to the machined workpieces W1 to W8. After that, the air supply means 53 jets hot air to the workpieces W1–W8 through the nozzles 51. Thus, the machined workpieces W1 to W8 can be dried.

The following cleaning operations are also conceivable.

(1) The cutting oil 54 only is sprayed towards the machined workpieces W1 to W8.

(2) The air supply means 53 jets cool air or hot an towards the workpieces W1 to W8.

(3) After the cutting oil 54 is sprayed towards the machined workpieces W1 to W8, the air supply means 53 jets cool air or hot air. The used oil is returned into the reservoir 54 (FIG. 4) after filtering the used oil from chips and dust.

This invention is not limited to a single embodiment. Referring to FIG. 3, the workpieces and the pallets for the workpieces in the exchange position EX can not be moved in the arrangement direction (the second direction U2). However, for another embodiment, the workpieces and the pallets in the exchange position EX may be moved in the alignment direction. That is, the moving direction is parallel to the robot moving direction Z1 or Z2.

Industrial Applicability

This invention is available for a pallet changer for use in a flexible manufacturing system. Pallets each having a workpiece can be efficiently exchanged.

I claim:

1. A pallet changer for a machine tool comprising:
   (a) a workstation comprising a plurality of members which form holes for a plurality of pallets each having a workpiece, the members being arranged at predetermined intervals in an endless chain manner such that one of the members can be positioned at a predetermined position;
   (b) a table for the machine tool for mounting one of the pallets; and
   (c) a pallet transferor positioned between the workstation and the machine tool to exchange one of the pallets positioned at the predetermined position for the pallet mounted in the table, the pallet transferor comprising,
      (1) a first mover arranged to be movable in a first direction parallel to the arrangement direction of the pallets positioned in the predetermined position,
      (2) a swinger mounted with respect to the first mover, the swinger being rotatable at a predetermined angle,
      (3) a second mover for moving the swinger along a second direction perpendicular to the first direction,
      (4) a rotator operably arranged with the swinger,
      (5) a third mover operably arranged with respect to the rotater, the third mover being moved along a third direction perpendicular to the second direction, and
      (6) first and second arms for detachably gripping the pallet positioned at the predetermined position and the pallet mounted on the table, the first and second arms being operably arranged with respect to the third mover such that the first and second arms can be rotated at a predetermined angle.

2. The pallet changer defined in claim 1, wherein the machine tool, the pallet transferor, the workstation, and the cleaning means are controlled by a computer numerical control unit.

3. The pallet changer defined in claim 1, wherein the workstation comprises a cleaning means for performing cleaning operations for the machined workpieces.

4. The pallet changer defined in claim 1, wherein the table can be indexed at a predetermined angle.

5. The pallet changer defined in claim 1, wherein the table can be arranged such that an axis of the pallet mounted on the table is parallel to the first direction.

6. The pallet changer defined in claim 1, wherein the first and second arms each have a pair of jaws for gripping the pallet.

7. The pallet changer defined in claim 1, wherein the swinger can be rotated at 180° about a vertical axis and the first mover moves along the first direction parallel to a horizontal direction.

8. The pallet changer defined in claim 1, wherein the second mover is a hydraulic cylinder.

9. The pallet changer defined in claim 1, wherein the first mover comprises a feed screw arranged with respect to the workstation, a moving member and a nut fixed to the moving member for engaging the feed screw.

10. The pallet changer defined in claim 3, wherein the machine tool, the pallet transferor, the workstation, and the cleaning means are controlled by a computer numerical control unit.

* * * * *